A. E. YERKES.
MULTIPLE SPRAYING DEVICE.
APPLICATION FILED JULY 12, 1912.
1,108,058.
Patented Aug. 18, 1914.
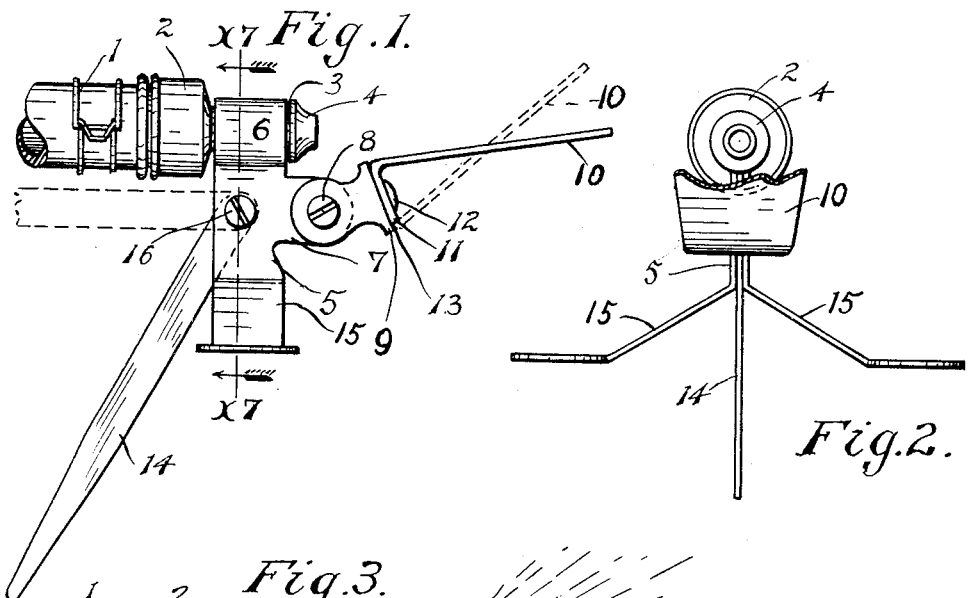
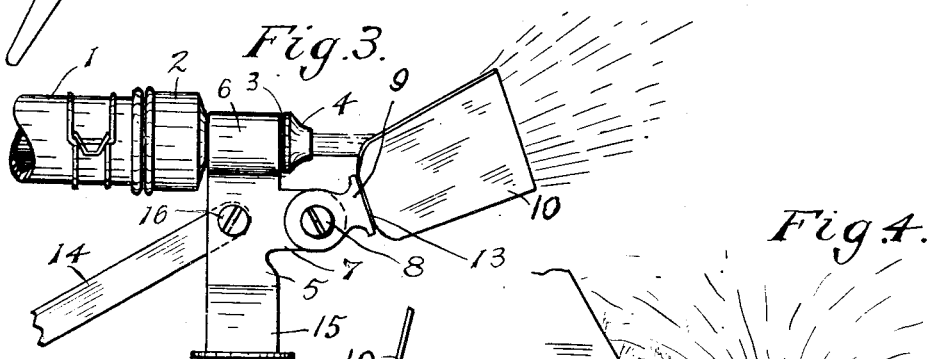
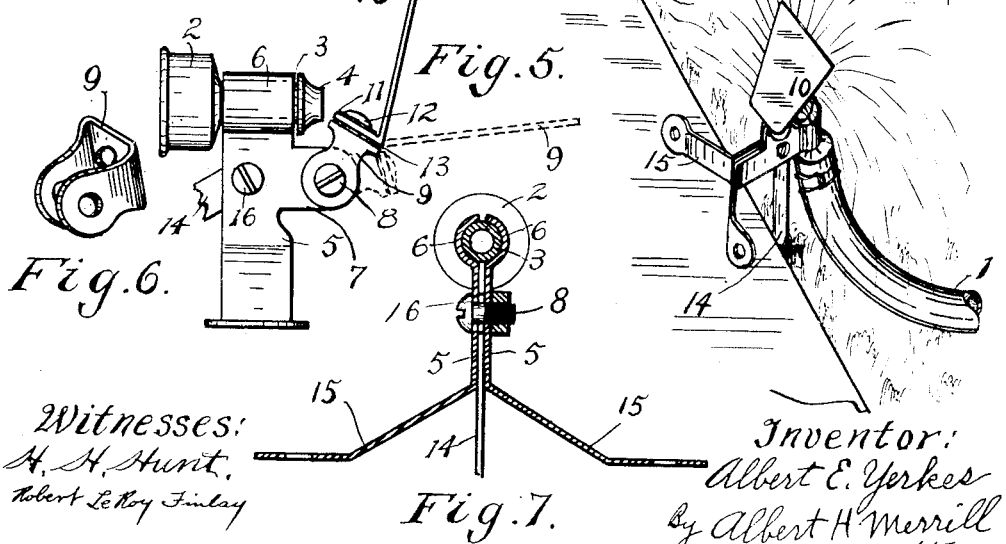
Witnesses:
H. H. Hunt.
Robert LeRoy Finlay
Inventor:
Albert E. Yerkes
By Albert H. Merrill
atty.

UNITED STATES PATENT OFFICE.

ALBERT E. YERKES, OF LOS ANGELES, CALIFORNIA.

MULTIPLE SPRAYING DEVICE.

1,108,058.  Specification of Letters Patent.  Patented Aug. 18, 1914.

Application filed July 12, 1912. Serial No. 709,093.

*To all whom it may concern:*

Be it known that I, ALBERT E. YERKES, a citizen of the United States, residing in the city and county of Los Angeles, State of California, have invented a new and useful Multiple Spraying Device, of which the following is a specification.

One of the principal objects of this invention is so to improve lawn sprinklers as to distribute the spray over particular spots or areas to the exclusion of other parts of a lawn or bed of flowers or other vegetation, and to do this by an appliance which is readily adjustable from one spraying position to another without the necessity of shutting off or checking the stream of water being delivered through the nozzle to which the appliance is attached or in combination with which it is used.

A further object of the invention is to provide a more satisfactory means of connecting the nozzle and spraying attachment with the means upon which the same are supported, such supporting means being peculiarly adapted to coöperate with the spraying blade hereinafter set forth to distribute the spray in an improved manner upon a lawn or other vegetation.

A still further object of the invention is to adapt the nozzle supporting means to resting upon a hard surface like a side-walk, or upon a mellow soil, and at all times to maintain the spraying device in a firm stable position.

Referring to the accompanying drawings which illustrate the invention, Figure 1 is a side elevation of the appliance showing the spraying blade in full lines in position to slightly spread the stream, said spraying plate being shown in dotted lines in a position to spread the stream to a greater extent; Fig. 2 is a front elevation of Fig. 1; a portion of the spraying plate being broken away to show the mouth of the nozzle; Fig. 3 is a side elevation showing the spraying plate adjusted to throw the stream out laterally from one side of the device; Fig. 4 is a perspective of the appliance showing the same on a smaller scale adjusted in position to safeguard the water from being distributed over any area except that which it is desired to water; Fig. 5 is a side elevation of the spraying device omitting the hose and illustrating two different positions of the spraying plate; Fig. 6 is an enlarged perspective view of the clip for attaching the spraying plate; Fig. 7 is a cross-section on line $x^7$—$x^7$ of Fig. 1, the pointed leg being regarded as in the dotted position of Fig. 1.

Referring in detail to the drawings, the hose 1 is attached in a well known manner to the nozzle 2, said nozzle being provided with a neck 3 and head 4. Said neck 3 is swiveled upon and supported by a pair of legs 5 which are furnished with outcurved nozzle-supporting portions 6, said legs together with the curved portions thereof being clamped together by suitable means, presently to be described, in order to form a standard to support the nozzle. Each of said legs 5 has a forwardly projecting lug or ear 7 located just below the nozzle-supporting elements 6. Said ears 7 are adapted to be clamped together by a screw 8 and to form a double support upon which is pivotally mounted a clip 9 so that said clip can be swung up or down to adjust in one plane the spraying plate 10 carried thereby. Said spraying plate 10 is furnished with a deflected base portion 11 which is secured to said clip 9 by means of a rivet 12. Owing to the base portion of the U-shaped clip 9 being in a plane spaced some little distance away from the pivot 8 whereon said clip is mounted, said clip is adapted to bring the inner end of the spraying plate 10 up close to the stream coming from the nozzle. This construction therefore provides for bringing the entire spraying portion 10 close up under the stream and at but a slight inclination to said stream (see Fig. 1). Superior results are therefore obtainable when it is desired to discharge a slightly broken stream at a considerable distance from the nozzle as, for example, in washing windows or in watering shrubbery. Said base 11 is bent at an acute angle with respect to the body portion of the spraying blade 10, and the clip 9 is furnished with a flat face 13 against which the deflected base 11 is brought and held in frictional contact by the rivet or screw 12 already referred to.

From the two positions of the spraying plate illustrated in Fig. 1 it will be seen that, owing to the base 11 of the plate 10 being formed at an acute angle with respect to the body portion of said plate, it is possible to secure a variation of the spray by simply giving a semi-rotation to the spraying plate without altering the adjustment of the clip 9 with respect to the lug 7 to which said clip is attached. It also permits the user tightly to screw down the pivot screw 8, thus holding the clip 9 firmly in one position, but nevertheless allowing the spraying plate to be adjusted at different angles, as illustrated in Fig. 1, by the axial rotation of said plate upon the rivet 12. Below the ears or lugs 7, each of the legs 5 are preferably provided with an outwardly deflected portion 15 to form a stable support when the appliance rests upon said legs.

In order to provide a reliable support upon which the spraying elements may be conveniently adjusted when the device is used on soft soil, or when positioned as illustrated in Fig. 4, a pointed supporting pin 14, is clamped between the middle portions of the legs 5 by means of a screw 16. It will be seen that a considerable portion of the legs 5 on each side of said supporting pin 14 are brought into frictional contact with said pin, owing to said pin being in the form of a flat, although relatively narrow and thick plate. This construction causes the nozzle to remain in frictionally tight angular adjustment with relation to said supporting pin 14, and therefore, when said pin has been thrust into the soil, the spraying device will remain in the adjusted position until the operator wishes to change the same to spray a different area.

The combination of the frictionally adjustable spraying plate with the frictionally adjustable supporting leg or pin 14 gives a practically unlimited number of variations in the character of the spray.

I claim:

1. In a spraying device, a nozzle, a support for said nozzle, a movable member mounted on said support, said member being adjustable separately from said nozzle and at various angles with relation thereto, and a spraying plate consisting of a spraying portion and a base portion extending at an acute angle with relation to the spraying portion of said plate, and means to fasten said base portion of said plate to said movable member in a pivotal manner to permit either side of the angular spraying portion of the plate to be presented to the stream.

2. The combination, with the nozzle, nozzle support, and vertically adjustable spraying plate secured to said nozzle support, of a pointed leg having a pivotal, friction-tight connection with said nozzle support, said leg being adapted for adjustment to point rearwardly of the nozzle to support said nozzle in a substantially vertical position, and said spraying plate being adapted to direct the spray to fall on the side of the nozzle opposite to said leg when the nozzle is thus adjusted, the side of the sprayed area nearest the nozzle being terminated by a well defined line passing through the spraying device.

In testimony whereof I have hereunto signed my name in the presence of two subscribing witnesses at Los Angeles, in the county of Los Angeles and State of California, this 6th day of July 1912.

ALBERT E. YERKES.

Witnesses:
ALBERT H. MERRILL,
JESSE W. WHANN.